L. A. Sanford,
Clasp Ring,
No. 82,643. Patented Sept. 29, 1868.

Witnesses.
E. M. Bliss.
Jeremy W. Bliss.

Inventor.
Leverett A. Sanford.

United States Patent Office.

LEVERETT A. SANFORD, OF WOLCOTT, ASSIGNOR TO HIMSELF AND ALBERT WARNER, OF BRISTOL, CONNECTICUT.

Letters Patent No. 82,643, dated September 29, 1868.

IMPROVED CLASP-RING.

*The Schedule referred to in these Letters Patent and making part of the same.*

TO ALL WHOM IT MAY CONCERN:

Be it known that I, LEVERETT A. SANFORD, of Wolcott, county of New Haven, and State of Connecticut have invented a certain new and useful Improvement in Clasp-Ring; and, to enable others skilled in the art to make and use the same, I will proceed to describe its construction by referring to the drawings, in which the same letters indicate like parts in each of the figures.

The nature of this invention will be understood from the specification and drawings, the object of which is to secure rings alternately upon a cord or rope, at any desirable distance apart, for the purpose of leading or driving animals, or for any other purpose for which they may be specially adapted.

$a$ is a hitch-ring.

$c$ are two halves of a clasp for clutching a cord or rope.

$d$ are enlarged flattened surfaces, at the junction of the ring with the flattened surfaces. These flattened surfaces are provided with orifices $i$, in one of which is formed a screw-thread, the other being of sufficient size to receive the body of the screw $k$, while the screw formed thereon enters the nut formed in the corresponding part, so that, when the screw $k$ is turned up closely, the two parts will be firmly compressed together.

Figure 1:
Figure 1 is a side view.
Figure 3:
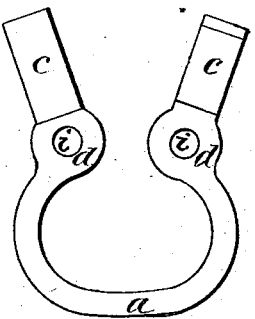
Figure 3 is a view of the pattern from which the mould is made to produce the casting.
Figure 2:
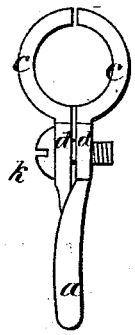
Figure 2 is an edge view.

The castings are made or swaged in the form as shown in fig. 3, afterward they are bent, so as to bring the two parts together in relative position with each other. The only work remaining to be done to complete the article is to fit the screw thereto, thus showing that it can be easily and quickly removed, adjusted, and replaced and secured when and where desirable, thus producing a cheaper, simpler, and better article than those now in use.

I believe I have thus shown the nature, construction, and advantage of this invention, so as to enable others skilled in the art to make and use the same therefrom.

What I claim, therefore, and desire to secure by Letters Patent, is—

A clasp-ring, made in one piece of metal, and secured by one screw, as an improved article of manufacture, substantially as described.

LEVERETT A. SANFORD. [L. S.]

Witnesses:
 E. W. BLISS,
 JEREMY W. BLISS.